INVENTOR.
JOHN H. WALLACE
BY Flam and Flam
ATTORNEYS

INVENTOR.
JOHN H. WALLACE
BY Flam and Flam
ATTORNEYS

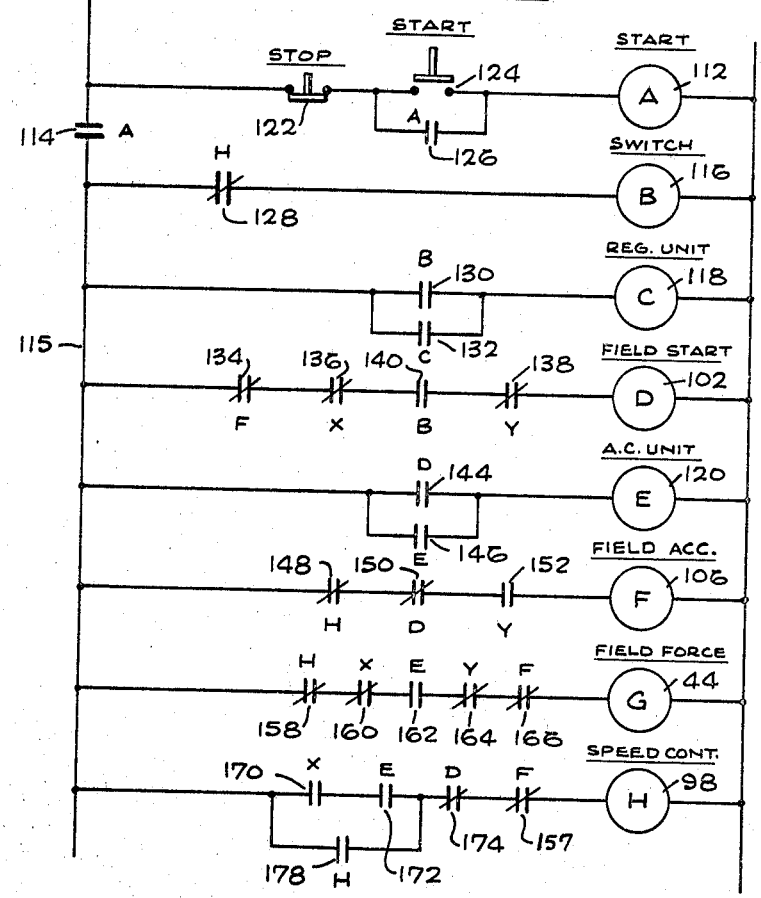

United States Patent Office 3,477,000
Patented Nov. 4, 1969

3,477,000
SPEED CONTROL SYSTEM INCORPORATING REGENERATIVE DRIVE
John H. Wallace, West Haven, Conn., assignor to Emerson Electric Co., St. Louis, Mo., a corporation of Missouri
Filed Nov. 3, 1966, Ser. No. 591,879
Int. Cl. H02k 1/26, 3/18, 17/24
U.S. Cl. 318—197       25 Claims

ABSTRACT OF THE DISCLOSURE

An induction motor is provided with a wound rotor and slip rings providing electrical access to the wound rotor. A regenerative unit has a D.C. component with its armature coupled to the wound rotor by suitable rectifiers. The induction motor has a starting mode and a running mode. In the starting mode the maximum voltage applied to the D.C. component is reduced to what it would normally be at about half speed. When the motor reaches about half speed, the system is shifted to its running mode. The power rating of the D.C. component is accordingly kept small.

BRIEF SUMMARY OF THE INVENTION

This invention relates to a variable speed drive for operating relatively high power loads. Controlling the secondary resistance of induction motors is a well known method of achieving a speed control. However, in high horsepower ranges, the energy dissipated in the secondary resistance becomes a factor of serious consideration. The slip energy may be salvaged by converting it to shaft power, or by returning it in electrical form to the power lines. In either case, initial cost of the additional dynamoelectric machinery becomes a significant factor. In one known system, the slip energy is used to power the D.C. component of a constant speed regenerative unit having an A.C. component returning power to the main lines. The required power rating of the D.C. motor depends upon the product of slip current (which corresponds to delivered torque) and the slip voltage (which corresponds inversely to the speed of the A.C. motor). At low speeds and high torque, the volt-amps of the D.C. component is considerable.

In many applications, only a limited speed range adjustment is necessary. Only a two to one speed range may be required; that is, speed need not reduce below 50% of full speed. In the operating speed range, the D.C. component at most handles only half the slip power that it would be required to handle if the speed range were extended to zero speed. This follows since the slip voltage is always less than or equal to half that at zero output speed. These observations are apparently meaningless because a high volt-amp rating of the D.C. component would still be required for starting.

The object of this invention is to provide a means for starting a system of this character in which the volt-amp rating of the D.C. component can be scaled to conditions in a limited operating range rather than for the full speed range. Accordingly, a substantial saving is effected in the initial cost without sacrifice of the economies resulting from the regenerative system. This object is accomplished by starting the system under a state in which the maximum voltage applied to the D.C. component is reduced to what it would normally be at about half speed. This maximum voltage is never exceeded. Thus the system comes up to half speed or higher as the voltage on the D.C. component is reduced. Thereupon, the system is switched to its operating state and the maximum voltage is restored on the D.C. component. The speed may be increased further as the voltage on the D.C. component reduces. All the while, and during both states of operation, the induced voltage at the induction motor slip rings opposes the voltage of the D.C. component, but with different functional relationships for the two operative states.

Various forms of the invention provide different but substantially equivalent means for determining the functional relationship between induced induction motor voltage and the armature voltage of the D.C. component. In one form of the invention, the slip ring motor is started on less than its full complement of phases. I have found that very high starting torque can yet be developed with two of three phases operative. Under such conditions, the voltage required to be handled by the D.C. component is reduced substantially to one-half. By these means, controlled starting is achieved with a D.C. component rated only half that which would otherwise be required. When the slip ring motor enters it operating speed range, the third phase of the motor is connected for normal operation.

In other forms of this invention, impedances are inserted during starting, either in the D.C. circuit or the A.C. circuit, or a transformer is inserted in the A.C. circuit. In still another form of the invention, the stator windings of the slip ring motor may be changed to provide different voltages.

In still another form of the invention, a neutral connection can be formed, either by an added inductor, or by virtue of the configuration of the rotor windings. A full phase rectifier couples the slip ring rotor to the D.C. component, and the D.C. component is switched from half wave operation, by the aid of the neutral, to full phase operation when half rated speed is achieved.

Another object of this invention is to provide a simple control and logic circuits for a system of this character. Another object of this invention is to provide a control system for automatically starting a system of this character under constant or selected torque conditions. Current flowing relative to the D.C. component constitutes the controlled variable in the system, determining or limiting the rate of acceleration.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

BRIEF DESCRIPTION OF THE DRAWINGS

FIG. 8 is a diagram of a logic circuit for controlling the system of FIG. 1, or equivalent systems incorporating the modified circuits of FIGS. 2 through 7; and FIG. 9 is a typical graphical representation of field voltage, armature voltage and speed as a function of time.

DETAILED DESCRIPTION

Figure 1:
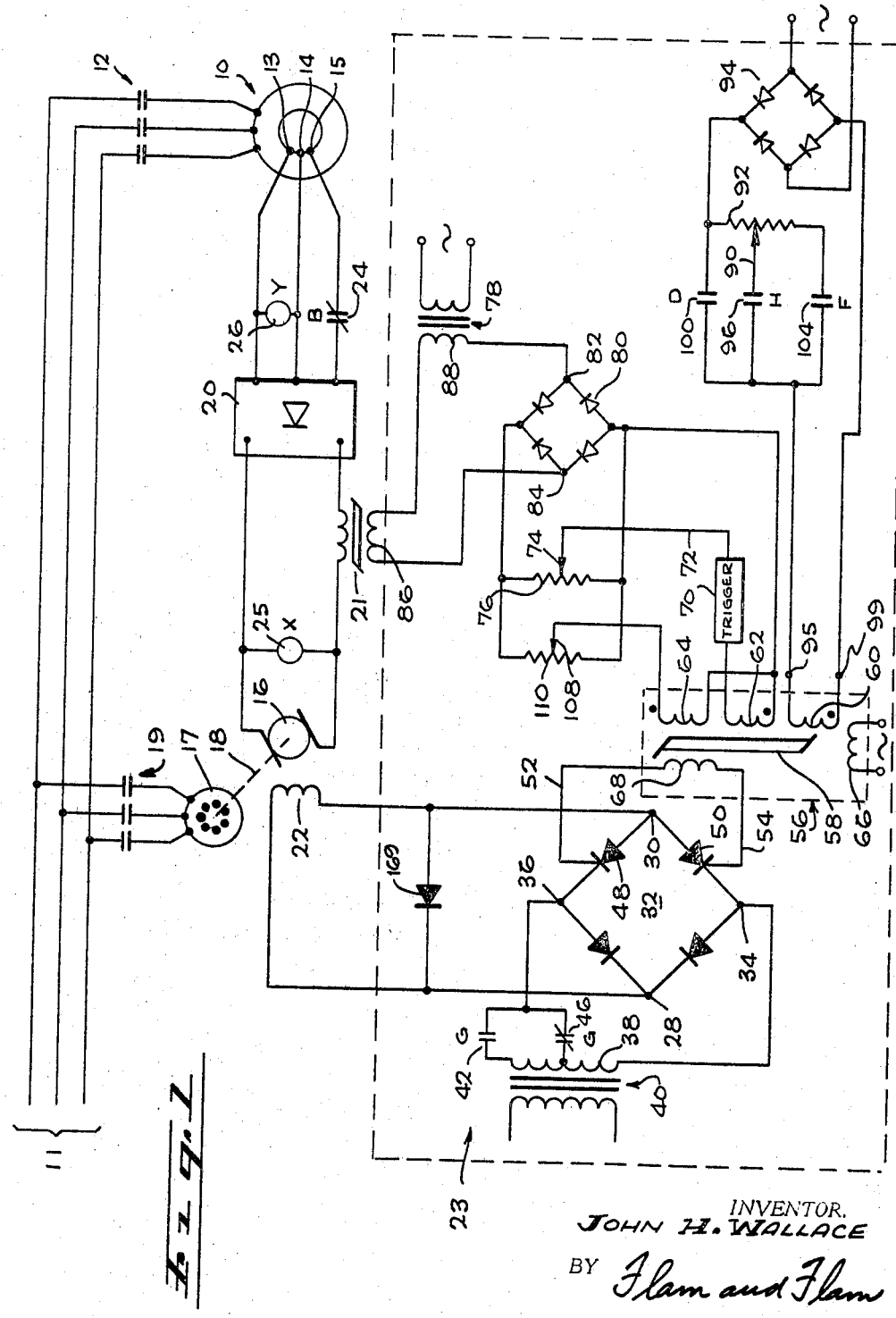
FIGURE 1 is a schematic diagram of the system incorporating the present invention.

In FIG. 1, there is illustrated a three phase induction motor 10 for operating the load (not shown). Windings of the motor are connected to a commercial source 11 by a conventional contactor 12. The motor 10 has a three phase wound rotor electrically accessible through slip rings 13, 14 and 15. In a well known manner, the speed of the induction motor 10 may be determined by controlling the slip ring voltage. Thus the slip ring voltage must be directly proportional to slip of the rotor, and if not, the rotor will accelerate or decelerate in order to satisfy this criterion. The slip ring voltage furthermore is used to return power to the lines 11 by the aid of a D.C. motor 16 and an induction generator 17 mechanically connected by a shaft 18.

The induction generator 17 connects to the supply lines 11 via a contactor 19. The armature of the motor 16 is connected to the slip rings 13, 14 and 15 whereby the current of the slip ring motor 10 is used to power the induction generator 17. A three phase rectifier 20 couples the alternating current of the slip ring rotor to the D.C. armature. Solid state rectifier elements of high rating being now available, a static rather than a dynamic rectifier is preferred; however, it will be understood that specialized dynamoelectric machinery could be used instead. One winding of current sensing reactor 21 (to be hereinafter described) is interposed in the armature circuit, and between the rectifier 20 and the D.C. machine 16.

The motor generator set 16–17 operates at a substantially constant speed; hence the field winding 22 of the D.C. component 16 determines the armature voltage. This armature voltage constitutes the reference to which the rectified slip ring voltage of the motor 10 is compared. Thus assuming equilibrium at some operating speed, then if the field of the D.C. component is reduced, increased current will be drawn by the armature as a result of the voltage disparity; consequently the output torque of the slip ring motor 10 increases and the load is accelerated until the slip reduces to a value sufficient to balance the system. If instead, the field of the D.C. component is increased, the current is reduced, and the load decelerates until the voltage increases sufficiently to balance the system.

Control circuitry 23 to be hereinafter described determines or provides a voltage for application to the field winding 22 of the D.C. motor 16.

In order to start the system with load torque but with a D.C. motor 16 of modest rating, use is made of a contactor 24 in one of the slip ring leads. This contactor opens and closes in order to cause operation of the slip ring motor 10 on two or three of its phases. If the contactor is closed, corresponding to conventional operation, then approximately full rated current and full induced voltage E would appear at the slip rings 13, 14 and 15 upon starting. The armature of the D.C. component would then be required to handle this voltage and current in order to determine the starting characteristics of the motor 10. Thus, the control circuitry must be set to determine full voltage E corresponding to that developed at 100% slip of the rotor of the motor 10. But operation in the two to one speed range, the slip ring voltage will not exceed $E/2$. Thus the required rating for starting with the contactor 24 always closed is twice that required for running.

The motor can be started when the contactor 24 is open. With the contactor 24 open, and the motor operating on only two rotor phases, a reduced torque is generated, but it is still adequate for most loads and the equivalent slip ring voltage only slightly exceeds $E/2$. The rating of the D.C. motor may accordingly be halved.

In order to start the system, the contactor 19 is first closed, and the regenerative unit comes up to speed, the generator 17 acting as an induction motor. The control circuitry 23 determines full field voltage V (FIG. 9). This provides armature voltage adequate substantially counterbalance the voltage $E/2$ induced at standstill in two phases of the wound rotor. The contactor 12 is closed after armature voltage reaches the required value. This is sensed by a relay 25 or other suitable device. The control circuitry 23 then automatically reduces the armature voltage as the armature current is monitored, and the slip ring motor increases its speed. By monitoring the armature current, it is ensured that a smooth acceleration is achieved and the rating of the machine is not exceeded, since a sudden change in field voltage would result in an excessive current until the slip ring motor accelerated to the speed set by the armature voltage. In practice, the control circuitry 23, which is adjustable to a set value, not only monitors the armature current, but provides an error signal that operates as to maintain the armature current, and hence torque, at a set value. Thus, if the circuitry 23 is set to limit the value of load current to 0.85 of full load current, then the field voltage will be automatically reduced at a rate determined by the inertia of the load, and as sensed by the saturable reactor 21.

A relay or similar device 26 senses speed of the slip ring motor and pulls in in response to the induced slip ring voltage. This device 26 drops out as the motor 10 reaches the lower part of the operating speed range, and the system shifts over for normal operation. At this point a forcing field is applied to the D.C. motor winding 22 in order to re-establish its armature voltage in the minimum possible time. A second increase in armature voltage is detected by relay 25 and the contactor 24 closes the third leg of the rotor. The normal field supply and speed control are also connected at this time. After a short transient period the motor operates in accordance with its normal characteristics.

The field winding 22 is energized from the output terminals 28 and 30 of a full wave rectifier bridge 32. The input terminals 34 and 36 of the bridge are connected to the secondary winding 38 of an input transformer 40. The terminal 34 is connected directly to one end of the winding 38. However, the terminal 36 may be connected to the other end of the winding 38 via normally open contacts 42 of a FIELD FORCE relay 44 (FIG. 8) to be hereinafter described or to an intermediate tap of the winding 38 (FIG. 1) via normally closed contacts 46 of the same relay.

Two of the rectifiers 48 and 50 in opposite half cycle branches of the bridge are controllable. Thus the rectifiers 48 and 50 have gate leads 52 and 54 operated by a magnetic amplifier 56. If the rectifiers 48 and 50 conduct over their entire half cycles respectively, and if the relay 44 remains de-energized, then the effective voltage V (FIG. 9) is applied to the field winding 22. By gating the controlled rectifiers 48 and 50 (FIG. 1) later and later in the corresponding half cycles, the voltage at the terminals 34 and 36 is reduced. By such means, the speed of the slip ring motor 10 is increased.

The magnetic amplifier 56 serves as the means for controlling the timing of the controlled rectifiers 48 and 50. The amplifier 56 has a common core 58 on which three D.C. control coils 60, 62 and 64 are wound. Also wound on the core is an A.C. input coil 66 and an output coil 68. The output coil 68 has ends respectively connected to the gate leads 52 and 54. In a well-understood manner, if the core 58 is saturated, as by one or core of the control coils 60, 62 or 64, the rectifiers 48 and 50 will conduct immediately as the corresponding half cycles begin. If, however, the core 58 is only partially saturated, then the rectifiers 48 and 50 begin conduction later in the corresponding half cycles, depending upon the degree of saturation produced by the control coils 60, 62 and 64. The combined current in the control coils 60, 62 and 64 thus determines the effective voltage of the field winding 22 and thereby the armature voltage and the speed of the slip ring motor 10.

The control coil 62 normally conducts no current. However, if the torque of the slip ring motor 10 (corresponding to slip ring current) exceeds a predetermined value, current is passed through the control coil 62 in an amount adequate to saturate the core 58. This produces maximum voltage for the field winding 22 and consequent correction in the operation of the slip ring motor 10.

In order to operate the control current 62, a trigger circuit 70 is provided. The trigger circuit 70 has an input lead 72 connected to a slider 74 which in turn engages a potentiometer resistor 76. The voltage across the potentiometer resistor 76 is directly proportional to the current in the armature circuit of the motor 16. The trigger circuit 70 operates when the voltage at the lead 72 reaches a preset value. Accordingly, if the armature current rise above a certain value the trigger circuit 70 will operate and saturate the coil 58. Armature voltage will increase and current will decrease as the motor slows down. The circuit 70 thus limits the torque developed.

In order to impress across the potentiometer resistor 76 a voltage corresponding to the armature current, a power transformer 78 and a full wave rectifier bridge 80 are provided. The rectifier bridge 80 has input terminals 82 and 84. Connected serially across these terminals are the secondary winding 86 of the current sensing reactor 21 and the secondary 88 of the power transformer 78.

The control coil 60 is used to determine the speed of the induction motor 10 under normal load conditions. For this purpose, the coil 60 may be connected to a slider 90 cooperable with a potentiometer resistor 92. A constant voltage is applied across the potentiometer resistor 92 by the aid of a full wave rectifier bridge 94. The slider 90 is connected to one end 95 of the coil through contacts 96 of a SPEED CONTROL relay 98 (FIG. 8). The other end 99 of the coil (FIG. 1) is connected to the lower end of the resistor 92. By moving the slider up or down, the rectifiers 48 and 50 in the supply circuit for the field winding 22 are caused to conduct sooner or later in the half cycles of operation. Accordingly, the normal armature voltage is determined.

The control coil 60 is also used to develop the initial field for the D.C. motor 16 at start. For this purpose, normally open relay contact 100 of FIELD START relay 102 (FIG. 8) connects the end of the coil 95 (FIG. 1) to the upper end of the potentiometer resistor 92. When the relay 102 is operative, maximum voltage is accordingly applied to the coil 60 to determine full voltage for the field winding 22 of the D.C. motor.

Once armature voltage is developed, the coil 60 is shunted so as to relinquish control to the torque limit circuit 74–76 to bring the motor up to speed as soon as possible. For this purpose, normally open contacts 104 of SHUNT relay 106 (FIG. 8) are connected directly across the coil 60 (FIG. 1). After the third phase is connected by the contacts 34, control is restored to the slider 90 by opening the contacts 104.

The potentiometer slider 90 adjusts the voltage at the armature of the motor 16. The armature voltage determines the speed of the slip ring motor 10. The speed of the motor 10 adjusts itself so as to provide an adequate current to sustain the torque.

The D.C. component is affected by the current flowing in the armature (armature reaction effect) so that an increase in current results in a decrease of armature voltage, thus providing the voltage difference required to allow more armature current to flow, thus compensating for the effect of increased load and thereby holding the speed of the motor 10 substantially constant.

In order to modify the speed torque curve (slip), a feedback network is provided. The feedback network includes the control coil 64. The current in the control coil 64 is directly porportional to the armature current and thus to torque. This relationship is achieved by connecting the coil 64 across the output terminals of the full wave rectifier bridge 80. Thus one end of the coil 64 cooperates with a slider 108 that engages a potentiometer resistor 110 connected across one output terminal of the bridge 80. The other end of the coil connects to the opposite output terminal. When the torque increases, the current in the coil 64 will correspondingly increase. By varying the current through the coil 64, the voltage applied to the field winding will be increased or decreased. The consequent change in armature voltage is used to adjust the relationship between slip and torque. The relationship between slip and torque is accordingly determined by the position of the slider 108 which controls the overall gain of the feedback loop. The potentiometer resistor 110 can be calibrated to read directly in percent slip at full load torque.

The logic circuit shown in FIG. 8 automatically accomplishes the starting of the system shown in FIG. 1. In addition to the relays 44, 98, 102 and 106, the logic circuit includes several other relays. One is a START relay 112 having normally open contacts 114 operative to connect power lead $L_1$ to a line 115 from which the remaining relays draw power. A SWITCH relay 116 switches the system over to normal operation, and in this instance controls the contacts in the third leg of the wound rotor. In other forms of the invention, the relay 116 may operate other devices. A REG. UNIT relay 118 serves to control the power leads to the A.C. component 17 of the regenerative unit. An A.C. UNIT relay 120 controls the power leads to the stator of the slip ring motor 10.

Contacts operated by the relays are coded with letters A–H; contacts operated by voltage sensing relays 25 and 26 (FIG. 1) are coded X and Y. Normally all of the relays shown in FIG. 8 are de-energized. The START relay 112 has an energization circuit that includes a normally closed stop switch 122 and a normally open start switch 124. Holding contacts 126 parallel the start switch 124.

STEP 1

When the start switch is closed, the relay 112 locks in. Power is now made available to the line 115. An energization circuit for the SWITCH relay 116 is immediately established through normally closed contacts 128 of the SPEED CONTROL relay 98. Accordingly, the third lead between the slip ring rotor and the rectifier 20 is opened. Immediately thereafter, power is provided to the REG. UNIT relay 118. This relay has an energization circuit that includes normally open contacts 130 of the SWITCH relay 116. A holding circuit is established through contacts 132.

The control 60 is also now connected so as to provide the maximum voltage V on the field coil 22 by operation of the FIELD START relay 102. The energization circuit for this relay includes normally closed interlock contacts 134 of the FIELD ACC. relay 106, normally closed contacts 136 of the armature voltage sensing relay 25, normally closed contacts 138 of the slip ring rotor voltage sensing relay 26, and normally open operating contacts 140 of the SWITCH relay 116.

STEP 2

The armature voltage begins to rise, as indicated at 142 (FIG. 9). When the armature voltage rises adequately, power is supplied to the slip ring motor by the A.C. UNIT relay 120. The energization circuit for this relay includes normally open contacts 144 of the armature voltage sensing relay. Holding contacts 146 keep the relay 120 energized and the power circuit for the motor stays on. At the same time control over the voltage of the field winding 22 is relinquished to the torque limit circuit 74–76.

For this purpose, the FIELD START relay 102 is de-energized by opening of contacts 136, and the SHUNT relay 106 is energized. The SPEED CONTROL relay 98 remains de-energized. The energization circuit for the FIELD ACC. relay 106 is completed through normally closed interlock contacts 148 of SPEED CONTROL relay 98, the normally closed interlock contacts 150 of the FIELD START relay 102, and normally open operating contacts 152 of the slip ring voltage sensing relay 26. The SPEED CONTROL relay 98 remains de-energized because contact 174 will open before contact E closes. This means that the SHUNT relay 106 operates first and, accordingly, the contacts 157 in the energization circuit for the SPEED CONTROL relay 98 will be opened.

The motor now increases its speed since the coil 64 reduces armature voltage; however, acceleration is limited by the torque limit circuit. The operation is indicated at 154 and 156 in FIG. 9.

STEP 3

The voltage sensing relays 25 and 26 both drop out when the slip ring motor comes up to about 50% speed in response to reduction in armature voltage. The energization circuit for the FIELD ACC. relay 106 opens at contacts 152, and the FIELD START relay 102 is now again operated by contacts 134 of FIELD ACC. relay 106. The FIELD FORCE RELAY 44 also operates as the SHUNT relay is de-energized. The result is a heavy field voltage of say, 1.5 v. as indicated at 159 in FIG. 9. The circuit for the FIELD FORCE relay 44 is completed through normally closed contacts 158 of the SPEED CONTROL relay 98, normally closed contacts 160 of the armature voltage sensing relay 25, normally open interlock contacts 162 closed by A.C. UNIT relay 120, normally closed contacts 166 of the FIELD ACC. relay 106. Contacts 166 serve to complete the circuit at this time. The free wheeling diode 169 is connected across the field winding to reduce the magnitude of the voltage transients caused by the operation of the FIELD FORCE relay contacts 42 and 46.

The armature voltage rises steeply as indicated at 168 (FIG. 9). The slip ring motor coasts in an attempt to restore rotor current; but control is quickly re-established as the armature voltage reaches the appropriate value for controlled operation on three phases.

STEP 4

The armature voltage sensing relay 25 pulls in again. The FIELD START relay 102 is thereby de-energized by opening of the contacts 136. But at this time the relay 26 remains de-energized, the motor not having coasted sufficiently to generate a voltage of sufficient magnitude. The FIELD ACC. relay 106 thus stays de-energized. The SPEED CONTROL relay 98 now pulls in for the first time. The energization circuit for the SPEED CONTROL relay 98 includes normally open contacts 170 of the armature voltage sensing relay, normally open interlock contacts 172 of the A.C. UNIT relay 120, normally closed contacts 174 of the FIELD START relay 102, and the normally closed contacts 157 of the FIELD ACC. relay 106. The circuit to the relay 98 is closed when the FIELD START relay 102 is de-energized by virtue of the operation of the contacts 174, the contacts 170, 172 and 157 having been previously closed. When the SPEED CONTROL relay 98 pulls in, the contacts 170 and 172 are shunted by holding contacts 178. Operation of the SPEED CONTROL relay 98 immediately closes the third leg of the slip ring rotor, by opening of contacts 128 in the energization circuit for the SWITCH relay 116. The motor is now under the control of the speed adjust slider 90 and the slip adjust slider 110.

Contacts 157 remain closed, FIELD ACC. relay 106 being locked out by contacts 148. Moreover, the contacts 174 must remain closed because the energization circuit for the FIELD START relay 102 that operates the contacts 174 has an energization circuit dependent upon the SWITCH relay 116. The SWITCH relay 106 being locked out by operation of the SPEED CONTROL relay 98, the FIELD START relay 102 is likewise locked out. Accordingly, the SPEED CONTROL relay remains operative, it now being independent of contacts 170 of the voltage sensing relay.

The FIELD FORCE relay 44 is likewise locked out by virtue of the operation of the relay contacts 158 of the SPEED CONTROL relay 98. Accordingly, during operation, the START RELAY 112 is energized, the REG. UNIT relay 118 is energized, the A.C. UNIT 120 is energized, and the SPEED CONTROL relay 98 is energized. The remaining relays are kept de-energized.

The FIELD FORCE relay 44 does not operate at the same time that the FIELD START relay 102 first operates because the FIELD FORCE relay 44 includes in its energization circuit the contacts 162 which depend upon the prior operation of the A.C. UNIT relay 120. However, the FIELD START relay 102 does not depend upon the A.C. UNIT relay 120. Accordingly, the FORCE FIELD relay 44 is energized when the voltage sensing relays 125 and 126 drop out subsequent to energization of the A.C. UNIT by operation of the A.C. UNIT relay 120.

The speed control relay 98 for a similar reason does not become energized until the armature voltage rises for the second time, namely, the time following initial energization of the A.C. UNIT by operation of the A.C. UNIT relay 120. It is for this purpose that the contacts 172 are provided in the energization circuit of the SPEED CONTROL relay 98.

Figure 2:
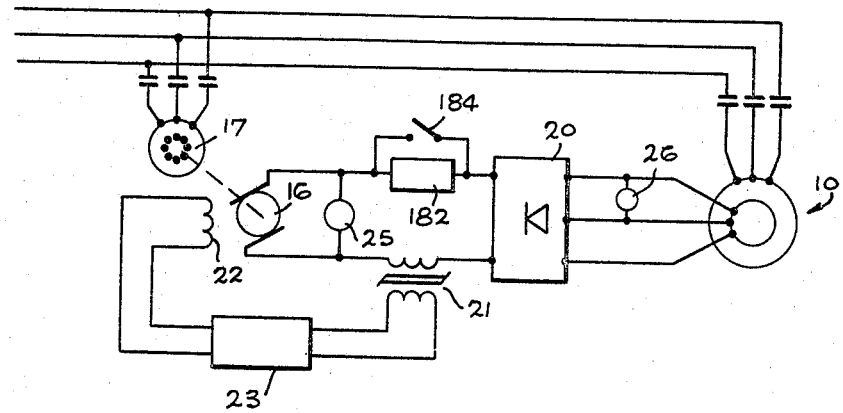
FIGS. 2 through 7 each illustrate modified forms of the present invention.

In the form of the invention illustrated in FIG. 2, the three slip rings of the motor 10 are at all times connected to the input of the three-phase rectifier 20. However, an impedance 182 is inserted in the D.C. armature circuit during starting so as to produce a voltage drop across it when starting current flows to minimize the rating of the D.C. component 16. In all other respects the system shown in FIG. 2 is similar to that shown in FIG. 1. Instead of reconnecting a third leg when the slip ring motor reaches the operating range, the impedance 182 is shunted, as by a switch 184 controlled by relay 116.

Figure 3:
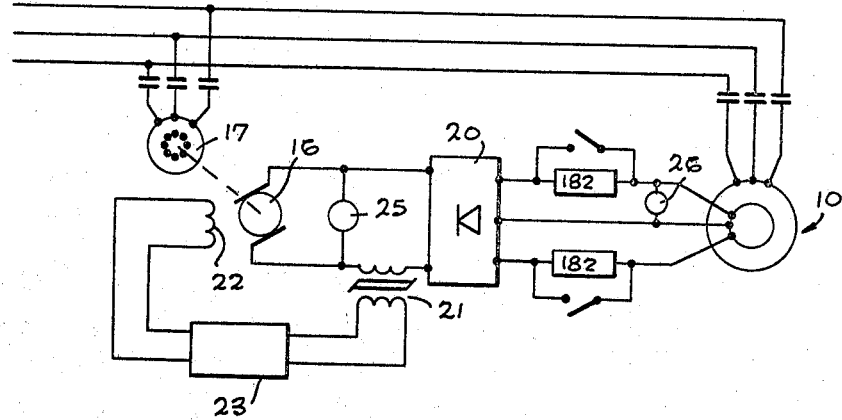

The same effect may be achieved by inserting impedances in the A.C. circuit, as indicated in FIG. 3.

Figure 4:
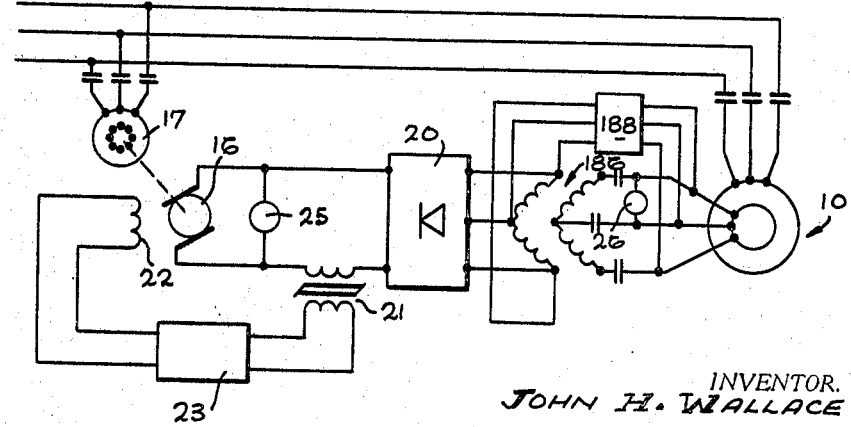

In the form illustrated in FIG. 4, an open delta transformer 186 is inserted between the slip rings of the motor 10 and the rectifier 20 for starting purposes. The power requirements of the D.C. component 16 are thus reduced. When the slip ring motor reaches the operating range, the transformer 186 is removed from the circuit by a switch device 188, as by logic circuitry such as shown in FIG. 9. The system shown in FIG. 4 is otherwise similar to that shown in FIGS. 1 to 3.

Figure 5:
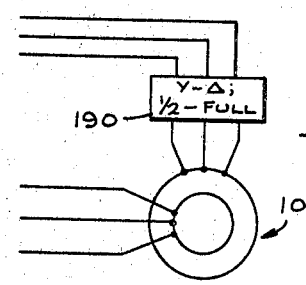

In the form illustrated in FIG. 5, the stator windings of the slip ring motor 10 may be altered during the starting mode. For this purpose, the configuration of the windings can be changed, for example, from Y to delta or from segments of the windings to the full windings. This is accomplished by a switching device 190. The system shown in FIG. 5 is otherwise similar to that shown in FIGS. 1 to 4.

Figure 6:
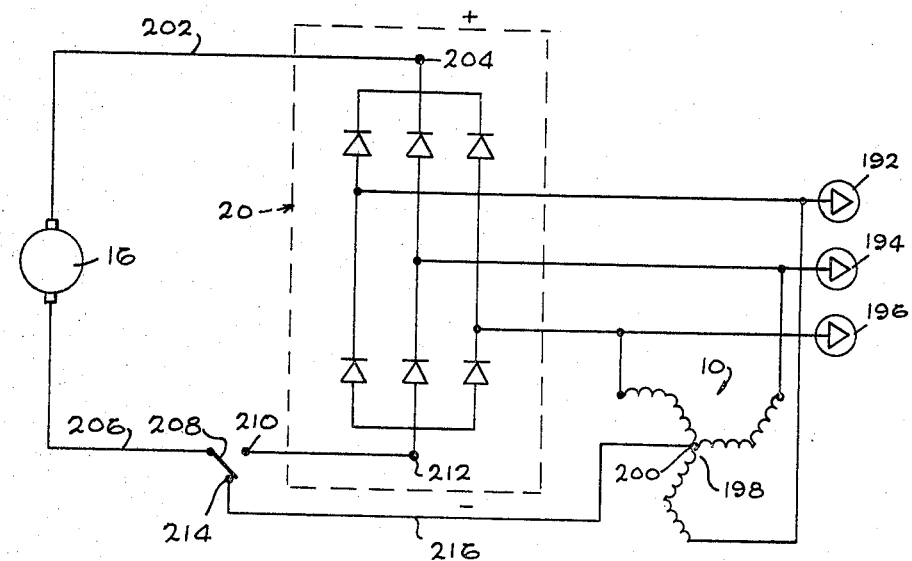
Figure 7:
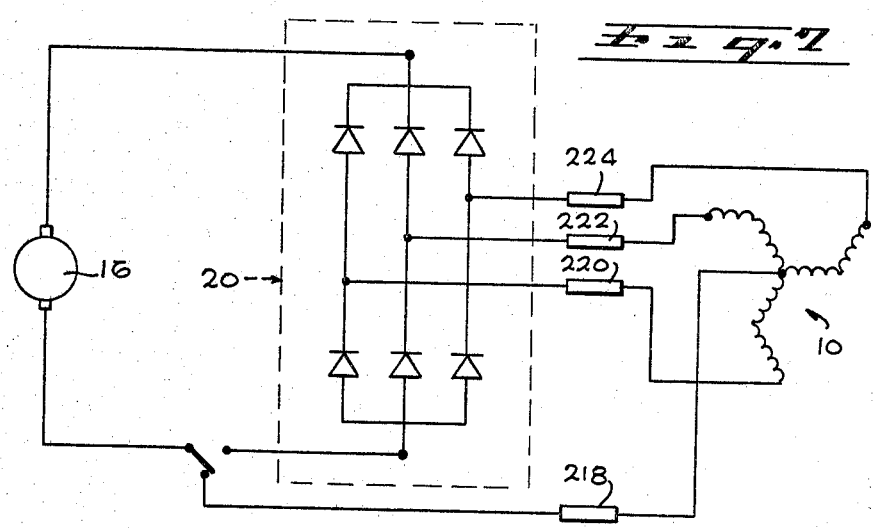

In the form shown in FIGS. 6 and 7, the rectifier 20 is made to operate either on full wave or on half wave. Accordingly, the armature of the D.C. component 16 may be switched from a low voltage to a high voltage condition. The low voltage mode is provided at start in order to use a D.C. component of modest rating.

In FIG. 6 the rotor of the induction motor 10 has but three slip rings 192, 194 and 196. No neutral connection being provided, a neutral is artificially formed by the aid of a three-phase inductor 198. The inductor 198 is Y-connected across the slip rings 192, 194, and 196, and thus provides a neutral at its star point 200. The inductor 198 has three cores. Windings on the same core are indicated as being drawn parallel to each other. Thus each winding section includes two components wound on two of the three cores. This zigzag arrangement is such that D.C. current components are balanced and a neutral is established in a well-understood manner.

One side of the armature of D.C. motor 16 is connected through a lead 202 to one output terminal 204 of the rectifier 20. The other side of the armature 16 is connected by a lead 206 to a switch arm 208. The switch arm in one position engages a contact 210 that connects to the other output terminal 212 of the rectifier 20. The other contact 214 of the switch 208 connects to a lead 216 and to the star point 200. Accordingly, when the switch arm 208 engages the contact 214, the slip ring rotor and the armature of the D.C. machine 16 are coupled in half wave rectified relationship, and when the switch arm 208 is in the opposite position, the coupling is in full wave rectified relationship. The switch 208 is operated in the same manner as before, the system being otherwise similar to the previous forms.

In the form illustrated in FIG. 7, a rotor of the induction machine 10 is zigzag wound for D.C. compensation purposes. Four slip rings 218, 220, 222 and 224 are provided, the slip ring 218 being the neutral. In this instance, the separate zigzag inductor is not required. Phase winding sections drawn parallel to each other are magnetically coupled.

The system shown in FIG. 7 is in all respects similar to that shown in FIG. 6.

The inventor claims:

1. In a speed control system: an induction motor having a wound rotor and slip rings providing electrical access to the wound rotor; a regenerative unit including a D.C. component having an armature; multi-mode means coupling the wound rotor to the armature of the D.C. component; said coupling means in each of its modes effecting a functional relationship between armature voltage and effective wound rotor current whereby a change in armature voltage produces a corresponding change in speed of said induction motor; said coupling means including a starting mode and a running mode, the functional relationship being such that the volt-amps of the armature circuit of the D.C. component in its starting mode is confined to a value substantially equal to that of the volt-amps of the armature circuit of the D.C. component in its running mode; means for shifting the modes of said coupling means; said coupling means including a full wave rectifier means having input terminals connected to said slip rings; and means providing a neutral whereby half wave rectified voltage may be derived from said rectifier means; said coupling means further including a switching means for connecting said armature to said ring motor either in full wave or half wave relationship through said rectifier means.

2. The combination as set forth in claim 1 in which said induction motor has multi-phase Y-connected rotor windings and a slip ring connected to the star point of said windings thus providing said neutral.

3. The combination as set forth in claim 1 in which said induction motor has multi-phase windings; a multi-phase inductor Y-connected across said slip rings, and providing said neutral.

4. The combination as set forth in claim 2 in which said rotor windings are zig-zag connected.

5. The combination as set forth in claim 3 in which said inductor has windings zig-zag connected.

6. A method of starting a speed control system that includes a wound rotor induction motor for operating a load, and a regenerative unit, the rotor of the induction motor having a plurality of phase windings, the regenerative unit including a D.C. component having an armature connected to said phase windings, said method comprising: reducing the field of the D.C. component from an initial value while one of the phase winding connections is opened and until the motor reaches an intermediate speed; and then restoring the field of the D.C. component and closing the previously opened phase winding.

7. The method as set forth in claim 5 together with the steps of monitoring a function corresponding to torque of said induction motor, and controlling the rate of said reducing of the field of the D.C. component.

8. The method as set forth in claim 5 together with the step of providing a signal corresponding to deviation of motor torque from a set value, and controlling the field of the D.C. component in accordance with said signal in a manner to reduce said signal.

9. A method of starting a speed control system that includes a wound rotor induction motor for operating a load, and a regenerative unit, the induction motor having a plurality of slip rings connected to phase windings of the rotor, the regenerative unit including a D.C. component having an armature, and a multi-phase rectifier connecting the armature to the slip rings, said method comprising: reducing the field of the D.C. component from an initial value while one of the connections from the slip rings to the rectifier is opened; increasing the speed of the motor to an intermediate value through the control of said field; and then restoring the field of the D.C. component and closing the previously opened phase winding connection.

10. The method as set forth in claim 9 together with the step of monitoring a function corresponding to torque of said induction motor, and controlling the rate of the said reducing of the field of the D.C. component.

11. The method as set forth in claim 9 together with the step of providing a signal corresponding to deviation of armature current from a set value, and controlling the field of the D.C. component in accordance with said signal in a manner to reduce said signal.

12. In a speed control system: an induction motor having a rotor provided with a number of phase windings; a regenerative unit having a D.C. component; said D.C. component having an armature and a field winding; means connecting the armature to said phase windings; a switch in one of said connecting means; means adjusting the field of said D.C. component; means operable when the motor reaches an intermediate speed for operating said switch to complete said connecting means; and control means responsive to a deviation of motor torque from a set value for operating said adjusting means in a direction to correct the said deviation.

13. In a speed control system: an induction motor having a rotor provided with a number of phase windings; a regenerative unit having a D.C. component; said D.C. component having an armature and a field winding; means connecting the armature to said phase windings; a switch in one of said connecting means; means adjusting the field of said D.C. component; and means operable when the motor reaches an intermediate speed for operating said switch to complete said connecting means; said means for operating said switch being responsive to the attainment of a predetermined intermediate speed by said motor.

14. In a speed control system: an induction motor having a wound rotor and slip rings providing electrical access to the wound rotor; a regenerative unit including a D.C. component having an armature; means coupling the wound rotor to the armature of the D.C. component; means determining a starting and a running mode of said system in which the volt-amps of the D.C. component in its starting mode is confined to a value substantially less than that of the volt-amps of the armature circuit of the D.C. component if started in its running mode; means for shifting the modes of operation of said system; said D.C. component having a field winding; control means determining a normal maximum energization of said field winding; means for automatically reducing the energization of said field winding; and means responsive to excessive armature current for increasing the energization of said field winding whereby said induction motor is permitted to accelerate under the limit control of said armature current responsive means.

15. In a speed control system: an induction motor having a wound rotor and slip rings providing electrical access to the wound rotor; a regenerative unit including a D.C. component having an armature and a field winding; means coupling the wound rotor to the armature of the D.C. component; means determining a starting and a running mode of said system in which the volt-amps of the D.C. component in its starting mode is confined to a value substantially less than that of the volt-amps of the armature circuit of the D.C. component if started in its running mode; means providing a signal corresponding to armature voltage; means providing a signal corresponding to speed of said induction motor; a logic network for starting said system in its starting mode, for automatically reducing armature voltage to reduce speed of said induction motor, and to shift said system to its running mode in response to reduction of armature voltage and increase in speed of said induction motor.

16. The combination as set forth in claim 15 together with means for limiting the rate of reduction of armature voltage in accordance with armature current.

17. The combination as set forth in claim 15 together with means determining a normal excitation of said field winding during the running mode; and means forming a negative feedback loop for adjusting armature voltage as a function of armature current thus to determine the slip of said induction motor at full rated torque.

18. In a speed control system: an induction motor having a wound rotor and slip rings providing electrical access to the wound rotor; a regenerative unit including a D.C. component having an armature and a field winding; means coupling the wound rotor to the armature of the D.C. component; means determining a starting and a running mode of said system in which the volt-amps of the armature circuit of the D.C. component in its starting mode is confined to a value substantially less than that of the volt-amps of the armature circuit of the D.C. component if started in its running mode; means determining a first starting step in which said field winding is energized to a predetermined level; means responsive to increase in armature voltage to a predetermined value for energizing said induction motor; means responsive to the induction of a predetermined current in said wound rotor and regenerative unit for causing automatic reduction in field excitation; means limiting the rate of reduction of field excitation in accordance with armature current; means responsive to attainment of a predetermined speed by said induction motor for providing a forcing excitation of said field winding; means responsive to restoration of armature voltage to a predetermined level for shifting to the running mode of said system and for energizing said field winding to said predetermined level; adjustable means operative upon attainment of said running mode for determining excitation of said field winding and thereby approximate speed of said induction motor; and a feedback loop controlled by armature current for modifying said field excitation to determine the relationship between slip and torque of said induction motor.

19. In a speed control system: an induction motor having a wound rotor and slip rings providing electrical access to the wound rotor; a regenerative unit including a D.C. component having an armature and a field winding; means coupling the wound rotor to the armature of the D.C. component; means determining a starting and a running mode of said system in which the volt-amps of the armature circuit of the D.C. component in its starting mode is confined to a value substantially less than that of the volt-amps of the armature circuit of the D.C. component if started in its running mode; a controlled rectifier for connecting an alternating current source to said field winding; a phase shift device synchronized with said source for producing a phase controlled output pulse operatively coupled to said controlled rectifier; said phase shift device having an input circuit; means cooperable with said input circuit for advancing the phase of said pulse for starting said system; means cooperable with said input circuit for adjustably determining a normal phase angle of said output pulse for selection of speed of said system; means cooperable with said input circuit for advancing the phase of said pulse in response to armature current exceeding a predetermined value; feedback means cooperable with said input circuit for determining the slip modification of said induction motor at load; and logic means for shifting said system from its starting mode to its running mode.

20. The combination as set forth in claim 6 in which said shifting means is operative in response to the attainment of preset speeds by said induction motor.

21. The combination as set forth in claim 7 in which said shifting means is operative in response to the attainment of preset speeds by said induction motor.

22. The combination as set forth in claim 8 in which said shifting means is operative in response to the attainment of preset speeds by said induction motor.

23. The combination as set forth in claim 9 in which said shifting means is operative in response to the attainment of preset speeds by said induction motor.

24. The combination as set forth in claim 10 in which said shifting means is operative in response to the attainment of preset speeds by said induction motor.

25. The combination as set forth in claim 16 together with means determining a normal excitation of said field winding during the running mode; and means forming a negative feedback loop for adjusting armature voltage as a function of armature current thus to determine the slip of said induction motor at full rated torque.

References Cited
UNITED STATES PATENTS

| | | | |
|---|---|---|---|
| 1,671,076 | 5/1928 | Jeffrey | 318—197 |
| 2,288,338 | 6/1942 | Willis | 318—197 |
| 3,059,159 | 10/1962 | Reza | 318—237 XR |
| 3,231,805 | 1/1966 | Shibata | 318—238 |
| 3,250,974 | 5/1966 | Wallace | 318—197 |

ORIS L. RADER, Primary Examiner

G. RUBINSON, Assistant Examiner

U.S. Cl. X.R.

318—237